United States Patent [19]

Kelley

[11] Patent Number: 4,837,272

[45] Date of Patent: Jun. 6, 1989

[54] CROSS-LINKING OF OLEFIN POLYMERS

[76] Inventor: Donald W. Kelley, 6205 Glenmoor, Garland, Tex. 75043

[21] Appl. No.: 77,881

[22] Filed: Jul. 27, 1987

[51] Int. Cl.$^4$ ............................................. C08F 8/42
[52] U.S. Cl. .................................... 525/59; 525/248; 525/263; 525/266; 525/274
[58] Field of Search ................. 525/59, 248, 269, 266, 525/274

[56] References Cited

U.S. PATENT DOCUMENTS

| | | | |
|---|---|---|---|
| 2,875,166 | 2/1959 | Hopkins | 525/274 |
| 3,344,105 | 9/1967 | McDonel et al. | 525/274 |
| 3,992,348 | 11/1976 | Jones et al. | 525/274 |
| 4,056,269 | 11/1977 | Pollitt et al. | 525/274 |
| 4,305,851 | 12/1981 | Tominaga et al. | 525/274 |
| 4,713,409 | 12/1987 | Hayes et al. | 525/274 |
| 4,720,526 | 1/1988 | Roland | 525/274 |
| 4,770,422 | 9/1988 | Isaac | 525/274 |

FOREIGN PATENT DOCUMENTS 76137529 6/1978 Japan .

Primary Examiner—Joseph L. Schofer
Assistant Examiner—Bernard Lipman
Attorney, Agent, or Firm—Donald W. Erickson

[57] ABSTRACT

A process for the cross-linking of olefin-polymers such as polyethylene which comprises reacting the polymer with a free radical generator to form a polymer having free radicals and reacting the polymer having free radicals with a tetrafunctional organo zirconate which has at least one functional group that is reactive with the free radicals on the polymer followed by contact thereof with moisture or water, optionally in the presence of a condensation reaction catalyst.

12 Claims, No Drawings

CROSS-LINKING OF OLEFIN POLYMERS

BACKGROUND OF THE INVENTION

It is well understood that the cross-linking of polymers improves the physical properties such as memory, heat resistance, resistance to chemicals, stiffness, etc. of the polymer. Current methods used for cross-linking polymers include the use of: radiation; free radical generating agents as described by U.S. Pat. No. 4,389,514; free radical generating agent, a silane and condensation catalyst as described by U.S. Pat. Nos. 3,646,155, 4,117,195 and 4,444,948; and silyl modified polymer reacted with an organo titanate (U.S. Pat. No. 4,526,930) or a phosphorus or antimony compound (U.S. Pat. No. 4,574,133) and optionally, a silanol condensation catalyst. U.S. Pat. No. 4,487,883 describes a process wherein a polymer having nitrogen-hydrogen bonding is cross-linked by reaction with a hydrolyzable titanate, zirconate, vanadate or germanate. The cross-linked polymer reverts to noncross-linked after exposure to liquid water. Japanese patent application No. 29530, filed Mar. 17, 1976 (Public Disclosure No. 111933-1977) describes the cross-linking of organic polymers by use of a hydrolyzable titanium compound and a free radical generating agent.

SUMMARY OF THE INVENTION

The present invention is directed at a process for the preparation of a cross-linked polymer, such as cross-linked polyethylene, said cross-linked polymer being characterized by cross-linking which is stable after exposure to water, which comprises reacting an polymer with a free radical generating agent; reacting the thus-formed free radical containing polymer with a tetrafunctional organo zirconate which has at least one functional group that is reactive with the free radicals on the polymer; and treatment thereof with moisture or water to cause hydrolysis of the hydrolyzable groups of the organo zirconate, and compositions useful for forming cross-linked olefin polymers. Optionally, a condensation reaction catalyst is employed in the process and compositions of the present invention.

DETAILED DESCRIPTION OF THE INVENTION

This invention relates to a process for effecting the cross-linking of thermoplastic polymers, including copolymers. The process entails generating a free radical on the polymer backbone by the use of a free radical generating agent such as a peroxide catalyst in a heated plasticating environment, such as an extruder, banbury, or any compounding plasticating equipment. The free radical on the polymer is reacted with a functional group of an organozirconate. A condensation catalyst may be included in the same plasticating step. The product formed in this process is then exposed to moisture or water in which hydrolysis takes place with the functional group(s) of the organozirconate and cross-linking is effected.

It is well understood that the cross-linking of thermoplastic polymers or copolymers improve physical properties such as memory, heat resistance, resistance to cracking, creep resistance, resistance to chemicals, stiffness, etc. The method of cross-linking described herein provides a means of achieving these improved physical properties as well as offering advantages over and overcoming the disadvantages of the current known methods used to cross-link said polymer and copolymers.

The cross-linking method described herein provides the following advantages.

1. It is believed that the organozirconate is an activator for free radical generating agents which thereby allows for a much smaller amount of radical generating agent to be used. Due to the small amount of radical generating agent used in the process, it is possible to use a broad range of processing equipment and conditions used in forming cross-linked polymers. The reduction in use level of the radical generating agent dramatically reduces the dange of explosion, fire or pre-mature cross-linking in the processing equipment.

2. Cross-linking is carried out after plasticating and forming with no additional heating required, thus allowing for recycling and the forming of difficult profiles.

3. The use of zirconates eliminates the need for pre-compounding in order to obtain uniform distribution thereof. The zirconates do not appear to generate volatile alcohols in the high temperature of the plasticating equipment thus reducing the potential for microporosity in the finished product.

4. The cross-linking of low molecular weight and hygroscopic polymers and copolymers may be carried out in atmospheric moisture with time. Higher molecular weight polymers should be exposed to significant amounts of water but will cross-link in lower temperature water than, e.g., the silane cross-link reaction.

The following examples are provided to illustrate the practice of the present invention.

EXAMPLE 1

| | Parts by Weight |
|---|---|
| Part A | |
| Ethylene-vinyl acetate copolymer (18% VA Ultrathene 631) | 100.0 |
| Dicumyl peroxide (40% Cadox 15) | .5 |
| Neopentyloxy trimethacryl zirconate | 3.0 |
| UV 1084 (UV light absorber) | .8 |
| Part A was compounded in a Banbury and then mixed as follows. | |
| Part B | |
| Part A | 100.0 |
| Color concentrate | 2.5 |
| Zinc oxide | 3.0 |
| Dibutyl tin dilaurate | .1 |

The resulting mix (part B was injection molded into coupons measuring $2\frac{3}{8} \times 3\frac{1}{4} \times 1/32$ inches.

| Temperature profile | | | | |
|---|---|---|---|---|
| | | | Mold | |
| Rear Zone | Front Zone | Nozzle | Stationary | Moving |
| 415° F. | 425° F. | 410° F. | 100° F. | 72° F. |

The coupons were placed in 78° F. water for 72 hours and were found to be cross-linked.

EXAMPLE 2

| | Percent by weight |
|---|---|
| Part A | |
| Resin HDPE (high density polyethylene) | 60.87 |
| Part B | |
| Talc | 31.30 |
| Carbon black | 1.60 |
| Dicumyl peroxide | .13 |

-continued
EXAMPLE 2

| | Percent by weight |
|---|---|
| Neopentyloxy trimethacryl zirconate (65%) | 3.00 |
| Dibutyl tin dilaurate | .10 |
| Zinc oxide | 3.00 |

The above was extruded on a twin screw extruder by feeding Part A into the first feed throat and feeding Part B into the second feed throat and then extruding into a pipe profile. The barrel temperature range was from 390°–410° F. Die temperature was 410° F. The pipe was placed into water at 120° F. for 72 hours and found to be cross-linked.

EXAMPLE 3

| | Percent by weight |
|---|---|
| Part A | |
| Ionomer resin (ethylene methacrylate copolymer) | 90.7 |
| Carbon black | 5.0 |
| Dicumyl peroxide | .1 |
| Neopentyloxy trimethylacryl zirconate (65%) | 2.0 |
| Polyester fibers | 2.0 |
| Antioxiant Irganox 1010 | .2 |
| Part B | |
| Part A | 99.9 |
| Dibutyl tin dilaurate | .1 |

Part A was compounded on a twin screw extruder and pelletized. Part A was then blended as in Part B. The resulting mix was then injection molded into articles.

| Temperature Profile (°F.) | | | | |
|---|---|---|---|---|
| | | | Mold | |
| Rear Zone | Front Zone | Nozzle | Stationary | Moving |
| 410 | 420 | 405 | 100 | 70 |

The items were exposed to a 90% H conditioning room for 5 days, 15 days and 30 days. The articles were found to be cross-linked.

EXAMPLE 4

| | Percent by weight |
|---|---|
| High density polyethylene* | 88.5 |
| Dicumyl peroxide | 0.2 |
| Neopentyloxy trimethacryl zirconate** | 1.2 |
| Dibutyl tin dilaurate | 0.1 |
| Glass fibers | 10.0 |

*U.S. Industrial Chemical Co. LB-742
**Kenrich Petrochemical Inc. LZ-33

Anti-oxidants and/or U.V. light stabilizers can be aded, such as, Irganox 1010, Tinuvin 234 or Chemassorb 944LD.

The foregoing ingredients were preblended by tumble mixing at room temperature until evenly dispersed. The preblend was then extruded or injection molded into an electric fence post profile at processing temperatures of 390° to 450° F. The post was then placed in 100° to 110° F. water for about 48 hours to cross-link the polymer.

EXAMPLE 5

| | Percent by weight |
|---|---|
| Ethylene vinylacetate copolymer* | 98.1 |
| Dicumyl peroxide | 0.2 |
| Neopentyloxy triacryl zirconate** | 1.5 |
| Dibutyl tin dilaurate | 0.2 |

*U.S. Industrial Chemical Co. Ultrathene UE 631
**Kenrich Petrochemical Inc. LZ-39

Anti-oxidant and/or U.S. light stabilizers can be added to the above formula, such as, Ciba Geigy's Irganox 1010 or Ferro's U.V. Check AM 205.

The above ingredients were preblended as in Example 4 and then compounded using an extruder or banbury. The formulation was then injection molded, 350° to 400° F., into livestock identification ear tags. The ear tags were placed in 100° to 110° F. water for about 48 hours to cross-link the copolymer.

Examples of the polymers useful in the present invention are polyethylene, copolymer of ethylene with propylene, butylene, hexene, vinyl acetate, methyl acrylate, ethyl acrylate, methyl methacrylate or ethyl methacrylate, polypropylene, polybutylene, polybutadiene, polyvinyl chlorides, polystyrene, polyvinyl ethyl ether, polyvinyl acetate, polyvinyl alcohol, polyvinyl formal, polyvinyl butyral, polyvinyl fluoride and polyvinylidene chloride.

The amount of organo zirconate employed in the composition of the present invention can vary considerably. The minimum requirement is that the organo zirconate be present in an amount sufficient to provide adequate functional groups that are reactive with the free radicals on the polymer to form the degree of cross-linking desired. An amount ranging from 0.1 to 15 parts, by weight, of the organo zirconate per 100 parts of the polymer can be used. More usually 0.5 to 10 parts of the organo zirconate per 100 parts of the polymer is used. The organo groups of the tetrafunctional organo zirconate can be selected from a multitude of organic radicals so long as at least one of the organo groups is reactive with the free radicals on the polymer. Suitable organic radicals include sat. or unsat. aliphatic hydrocarbon radicals and sat. or unsat. aliphatic hydrocarbon oxy radicals. Preferred organo zirconates or the lower alkoxy tri(meth)acryl zirconate such as neopentoxy triacryl zirconate, neohexoxy triacryl zirconate, neopentoxy trimethacryl zirconate and neohexoxy trimethacryl zirconate.

Suitable free radical generators for use in the present invention include dicumyl peroxide, benzoyl peroxide, t-butyl peroctoate, t-butyl perpivalate and others as listed in U.S. Pat. No. 3,646,155, the disclosure of which is incorporated herein by reference. The amount of free radical generator used in the present invention can be very small so long as it is present in an amount sufficient to generate free radicals on the polymer. Generally, an amount of free radical generator within the range of about 0.1 to 1.0 parts per 100 parts of the polymer is used.

The use of a condensation catalyst such as the tin compounds and fatty acids is optional. It is preferred, however, to include a condensation catalyst in the compositions of the present invention. The amount of condensation catalyst does not appear to be critical and may vary from about 0.05 to 1.0 parts per 100 parts of the composition. Suitable condensation reaction catalysts include dibutyl tin dilaurate, dibutyl tin dioctoate and other catalysts as listed in U.S. Pat. Nos. 4,389,514 and 3,7646,155, the disclosures of which are incorporated herein by reference.

Various additives such as dyes, fillers, anti-oxidants, U.V. absorbers and pigments can be included in the compositions of the present invention.

The cross-linked polymers formed by the present invention have numerous useful applications such as for forming pipe, posts, cattle ear tags, gates, pails, feed buckets, handles, stakes, jacketed wire and cable, and panel and sheet materials.

What is claimed is:

1. A composition useful for forming a cross-linked polymer said cross-linked polymer being characterized in that the cross-linking is stable after exposure to water, which comprises:
   (a) a polymer selected from polyethylene, copolymer of ethylene with propylene, butylene, hexene, vinyl acetate, methyl acrylate, ethyl acrylate, methyl methacrylate or ethyl methacrylate, polypropylene, polybutylene, polybutadiene, polyvinyl chloride, polystyrene, polyvinyl ethyl ether, polyvinyl acetate, polyvinyl alcohol, polyvinyl formal, polyvinyl butyral, polyvinyl fluoride and polyvinylidene chloride;
   (b) a free radical generator which is capable of and is present in an amout sufficient for generating free radicals on the polymer; and
   (c) an organo zirconate which has at least one functional group that is reactive with the free radicals on the polymer selected from neoalkoxy triacryl zironate and neoalkoxy trimethacryl zirconate, wherein said organo zirconate is present in an amount sufficient to provide adequate functional groups that are reactive with the free radicals on the polymer to form said cross-linked polymer.

2. A composition according to claim 1 wherein the polymer is polyethelene or a copolymer of ethylene methylacrylate, ethylene ethylacrylate or ethylene vinylacetate.

3. A composition according to claim 1 wherein the polymer is selected from copolymers of ethylene-propylene, ethylene-1-butene, or ethylene-1-hexene.

4. A composition according to claim 1 wherein the polymer is selected from polystyrene, polyvinyl chloride, polyvinyl acetate, polyvinyl alcohol, polyvinyl formal, polyvinyl butyral, polyvinyl fluoride and polyvinylidene.

5. A composition according to claim 1 wherein the free radical generator is selected from dicumyl peroxide, benzoyl peroxide, t-butyl peroctoate and t-buryl perpivalate.

6. A composition according to claim 5 wherein the amount of free radical generator is from about 0.1 to 1.0 parts per 100 parts of the polymer.

7. A composition according to claim 6 wherein the neoalkoxy is neopentyloxy.

8. A composition according to claim 1 wherein the neoalkoxy is neohexyloxy.

9. A composition according to claim 1 wherein the amount of organo zirconate is from about 0.1 to 10.0 parts per 100 parts of the polymer.

10. A composition according to claim 1 which includes a condensation reaction catalyst.

11. A composition according to claim 1 which includes a condensation reaction catalyst capable of and in sufficient amount to hydrolyze the neoalkoxy group of the organo zirconate.

12. A composition according to claim 11 wherein the condensation catalyst is dibutyl tin dilaurate, dibutyl tin diacetate or dibutyl tin dioctoate.

* * * * *